United States Patent [19]

Peters

[11] Patent Number: 4,936,719
[45] Date of Patent: Jun. 26, 1990

[54] CUTTER AND INDEXABLE ON EDGE INSERTS WITH ALIGNED CORNERS AND STAGGERED SERRATED EDGES

[75] Inventor: Robert W. Peters, Saegertown, Pa.

[73] Assignee: Greenleaf Corporation, Saegertown, Pa.

[21] Appl. No.: 186,262

[22] Filed: Sep. 11, 1980

Related U.S. Application Data

[63] Continuation-in-part of Ser. No. 717,360, Aug. 24, 1976, abandoned, and a continuation-in-part of Ser. No. 813;539, Jul. 7, 1977, abandoned, and a continuation-in-part of Ser. No. 882,993, Mar. 3, 1978, abandoned.

[51] Int. Cl.$^5$ .......................... B23C 5/06; B23C 5/20
[52] U.S. Cl. ........................................ 407/42; 407/113
[58] Field of Search ........................... 407/113, 114, 42

[56] References Cited

U.S. PATENT DOCUMENTS

| | | | |
|---|---|---|---|
| 3,574,911 | 4/1971 | Penoyar | 407/114 |
| 3,636,602 | 1/1972 | Owen | 407/114 |
| 3,694,876 | 10/1972 | Erkfritz | 407/113 |
| 3,701,187 | 10/1972 | Erkfritz | 407/113 |
| 3,827,119 | 8/1974 | Bennett | 407/114 |
| 3,875,631 | 4/1975 | Malinchak | 407/113 |
| 4,068,976 | 1/1978 | Friedline | 407/114 |
| 4,140,431 | 2/1979 | Friedline | 407/114 |
| 4,180,355 | 12/1979 | Nanini | 407/113 |
| 4,248,553 | 2/1981 | Kraemer | 407/114 |

FOREIGN PATENT DOCUMENTS 2549930 12/1977 Fed. Rep. of Germany ...... 407/114

Primary Examiner—William Terrell
Attorney, Agent, or Firm—Ralph Hammar

[57] ABSTRACT

A rectangular insert of cutting material having top and bottom surfaces intersected by longitudinal edge surfaces to form four main longitudinal cutting edges. The top and bottom surfaces have ribs normal to the edge surfaces at each corner and sinusoidally spaced ribs normal to the edge surfaces starting at graduated distances from each corner rib so that when the inserts are stacked edgewise in different index positions, the corner ribs register with each other and the other ribs are out of phase with each other. The ribs of the cutting edges all extend edgewise of the bit or in the width direction so that the width of the insert is available to take the cutting thrust. When four of the inserts are stacked edgewise, each in a different one of the four index positions, the corners of the bits are all in alignment, thereby providing the finish of four identical inserts and the serrated edges provided by the sinusoidal ribs are in staggered relation so that each rib takes a fine chip which reduces the chattering.

10 Claims, 2 Drawing Sheets

SIDE 1 ———
SIDE 2 – – –
SIDE 3 ·······
SIDE 4 —·—·—

CUTTER AND INDEXABLE ON EDGE INSERTS WITH ALIGNED CORNERS AND STAGGERED SERRATED EDGES

This application is a continuation-in-part of application Ser. Nos. 717,360, filed 08/24/76, 813,539 filed 07/07/77, and 822,993, filed 03/03/78, all abandoned and all incorporated by reference.

This invention is intended to provide a milling cutter with the strength and cutting power of edgewise cutting, with the freedom from chattering and vibration of staggered or out of phase or serrated sinusoidal cutting edges and with the finish of inserts with aligned rounded corner edges.

Figure 4:
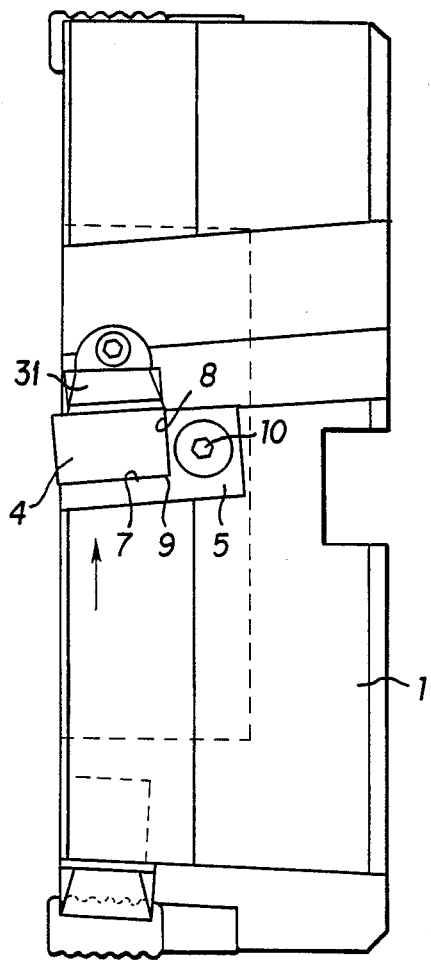
FIGS. 4 and 5, are fragmentary edge and end views of a milling cutter using the inserts.
Figure 5:
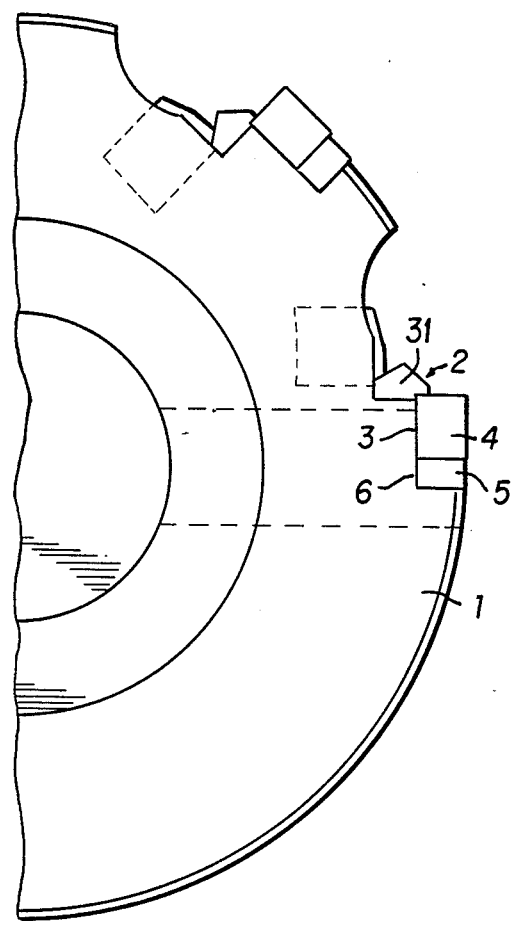

In the drawing, FIGS. 4 and 5 show a cylindrical milling cutter body 1 having a plurality of axially extending notches 2 angularly spaced about the axis of rotation of the body. Each of the notches has a flat bottom seat 3 for supporting an indexable tungsten carbide insert 4 and an anvil 5. Each anvil has a flat bottom surface 6 resting on the seat and upstanding edge surfaces 7 and 8 which cooperate to provide a corner 9 locating the imperforate generally rectangular insert 4. Each anvil is held in place by a set screw 10. The seats and anvils are identically constructed and the edge surfaces 7, 8 cooperate with the bottom seat 3 to identically position the inserts 4 with relation to the axis of the cutter body.

The inserts 4 each consists of a generally rectangular block of cutting material, such as tungsten carbide, having a top surface 11, a bottom surface 12, longitudinal edge surfaces 13, 14 and end edge surfaces 15, 16. The thickness of the insert, the distance between the top and bottom surfaces 11 and 12, is less than the width of the insert, the distance between the longitudinal edge surfaces 13, 14. The length of the insert, (the distance between the end edge surfaces 15, 16) is greater than either the width or thickness of the insert. The top and bottom surfaces 11, 12 are at right angles to the longitudinal edge surfaces 13, 14 and to the end edge surfaces 15, 16, and the longitudinal and edge surfaces are at right angles to each other. The corner edge surfaces 17, 18 adjacent the end edge surface 15 and the corner edge surfaces 19, 20 adjacent the end edge surface 16 are symmetrical and of identical curvature.

Figure 2:
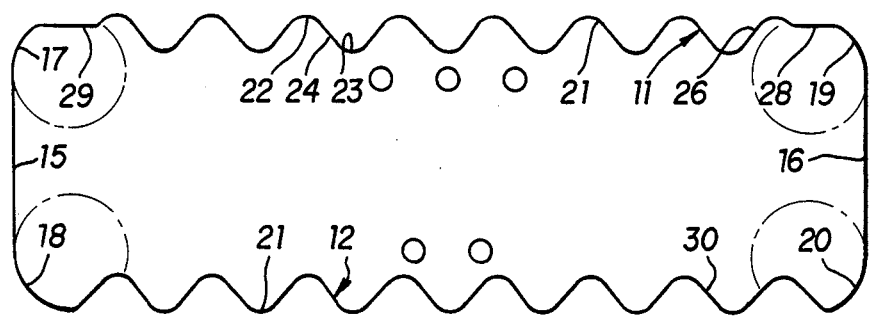
Figure 3:
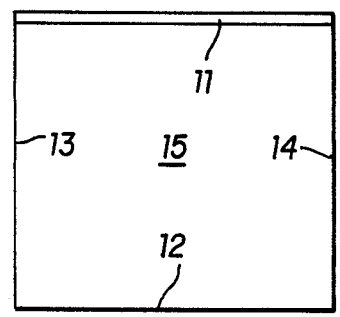
FIG. 3 is an end view of the insert.

FIG. 2 shows the corner edges 17–20 formed by identical cylindrical surfaces tangent to the end surfaces 15, 16. If a plurality of inserts are stacked edgewise with their longitudinal edge faces in engagement and their end edge surfaces in register, the corner edges 17–20 will register. This is true whether the stacked insert has its end edge surface 15 registering with an edge surface 16 of an adjacent insert. It is also true if the inserts are relatively inverted so that a top surface 11 of one insert is adjacent the bottom surface 12 of an adjacent insert. No matter how the inserts are inverted or turned, end for end, or top for bottom, the end edge which comes into cutting position will have the same position relative to the cutter body as every other end edge which is in cutting position. The corner edges 17–20 have the same cutting action no matter how the insert is indexed.

Figure 1:
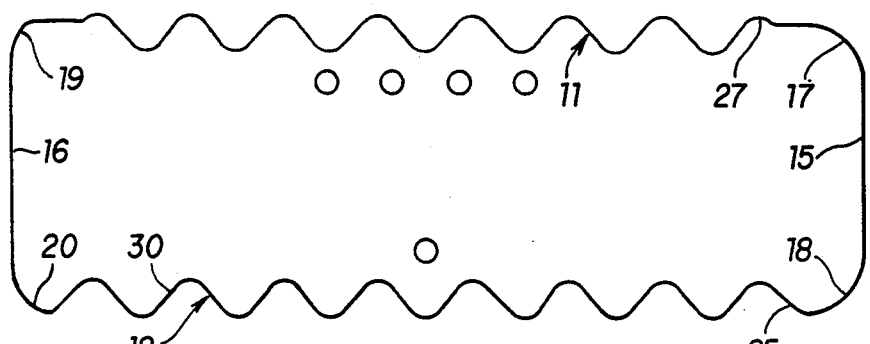
FIGS. 1 and 2 are edge views of an insert.
Figure 6:
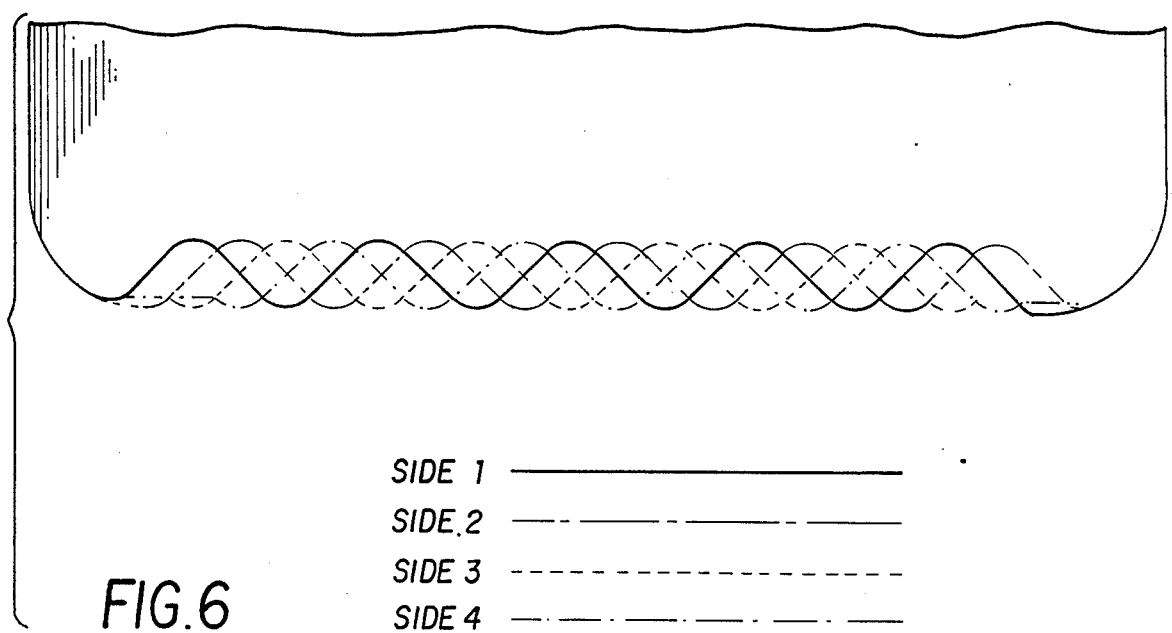
FIG. 6 is a diagrammatic view showing the cutting action of the inserts.

In each of the upper and lower surfaces 11, 12 is a series of identically spaced generally sinusoidal ribs 21 at right angles to the longitudinal edge faces 13, 14. Each of the ribs 21 has a rounded crest 22 and a correspondingly rounded root 23 and straight sides 24 extending between the crests and roots. While this is not mathematically exactly sinusoidal, it is close enough to be a working approximation of sinusoidal shape. There are two sets of ribs 21, one set being on the top face 11 and the other set being on the bottom face 12. Although there are only two sets of ribs, the effect of the ribs is to provide four staggered serrated cutting edges, as shown in FIG. 6. The reason for the staggering is that the ribs start at different distances from the corner edges 17–20. When side "o" is in active cutting position, the insert is supported on seat 3 by surface 11 and the corner edge 20 makes the final finish cut. When edge "oo" is in active cutting position, the insert is still supported on seat 3 by surface 11, but is rotated 180° from the position shown in FIG. 1 so as to bring the edge "oo" outermost and the corner 18 into active cutting position. When cutting edge "ooo" is in active cutting position, the insert is supported on seat 3 by surface 12 and the corner 19 is in active cutting position. It will be noted that the rib 26 starts a greater distance inward from the corner than did the rib 25 for side "oo". When cutting edge "oooo" is in active cutting position, the insert is supported on seat 3 by surface 12 and cutting edge 17 is in active cutting position. The cutting edge 27 nearest the corner 17 starts further away from the corner than did the initial ribs 25 and 26 for cutting edges "oo" and "ooo". When four inserts are arranged on four successive seats 3 in the milling cutter body shown in FIGS. 4 and 5 so that cutting edges "o", "oo", "ooo", and "oooo" are successively in active cutting position, the resultant cutting action is shown in FIG. 6. It there appears that all corner edges have the same cutting action, but the longitudinal cutting edges associated with each corner have a different cutting action resulting from the stepped sinusoidal ribs. The purpose of the lands 28 and 29 is to permit the stepped cutting action of the sinusoidal ribs to be moved closer to the corners 17 and 19. top face 11 and the other set being on the bottom face 12. Although there are only two sets of ribs, the effect of the ribs is to provide four staggered serrated cutting edges, as shown in FIG. 6. The reason for the staggering is that the ribs start at different distances from the corner edges 17–20. When side "o" is in active cutting position, the insert is supported on seat 3 by surface 11 and the corner edge 20 makes the final finish cut. When edge "oo" is in active cutting position, the insert is still supported on seat 3 by surface 11, but is rotated 180° from the position shown in FIG. 1 so as to bring the edge "oo" outermost and the corner 18 into active cutting position. When cutting edge "ooo" is in active cutting position, the insert is supported on seat 3 by surface 12 and the corner 19 is in active cutting position. It will be noted that the rib 26 starts a greater distance inward from the corner than did the rib 25 for side "oo". When cutting edge "oooo" is in active cutting position, the insert is supported on seat 3 by surface 12 and cutting edge 17 is in active cutting position. The cutting edge 27 nearest the corner 17 starts further away from the corner than did the initial ribs 25 and 26 for cutting edges "oo" and "ooo". When four inserts are arranged on four successive seats 3 in the milling cutter body shown in FIGS. 4 and 5 so that cutting edges "o", "oo", "ooo", and "oooo" are successively in active cutting position, the resultant cutting action is shown in FIG. 6. It there appears that all corner edges have the same cutting action, but the longitudinal cutting edges associated with each corner have a different cutting action resulting from the stepped sinusoidal ribs. The purpose of the lands 28 and 29 is to permit the stepped cutting action of the sinusoidal ribs to be moved closer to the corners 17 and 19.

There are several advantages of this invention. First, it produces a better finish than the usual sinusoidally distributed rib structure shown in U.S. Pat. No. 3,574,911. Second, because of the edgewise cutting action, applicant's inserts are more rigid and less likely to break. Furthermore, if the teeth should break, the break is usually limited to the end of the rib adjacent the longitudinal edge face in active position and does not extend clear across the bit and ruin the faces on both sides of the insert.

For example, in a conventional insert, breaking of rib 30 on face "o" would extend across to, (or close to), face "oo", and faces "o" and "oo" could not be used. The additional strength of inserts for edgewise cutting reduces the likelihood of breaking the end of rib 30 at face "o" and also reduces the likelihood that the break would extend close enough to face "oo" to prevent further use of that face. Third, applicant's construction enables the sinusoidally distributed ribs to be brought closer to the corners and thereby have the advantage of distributed cuts for shallow, as well as deep cuts. Fourth, applicant uses only a single insert, but obtains the distributed or graduated cutting action of four cutting edges.

The inserts are crowded edgewise into the corners 9 by wedges 31 such as disclosed in U.S. Pat. No. 3,056,186. The wedges contact the lower half of the longitudinal edge faces 13 or 14, whichever is in active cutting position.

The chips are generally triangular in cross-section with a wide smooth surface at the base of the triangle and rough surfaces converging toward the apex of the triangle.

I claim:

1. An indexable on edge insert adapted to be supported on a flat platform on a cutter body and crowded edgewise against positioning means on said platform, said insert comprising a generally rectangular imperforate block of cutting material having top and bottom surfaces alternatively adapted to rest on and be supported by said platform and having leading and trailing elongated longitudinal edge faces along opposite side edges constituting the cutting faces of four main cutting edges defined by the intersections of said edge faces with said top and bottom surfaces and having short end edge faces between said top and bottom surfaces at opposite ends of said longitudinal edge faces, said end edge faces being adapted to about said positioning means to locate the insert endwise on said platform, said insert having four index positions with two positions having the active main cutting edges at the intersection of the top surface with opposite longitudinal edge faces of the insert when indexed so the bottom surface rests on the platform and with the other two positions having the active main cutting edges at the intersection of the bottom surface with opposite longitudinal edge faces of the insert when indexed so the top surface rests on the platform, said top and bottom surfaces having arcuate corner ribs at each end normal to said longitudinal edge faces and extending in the width direction edgewise across said block, the corner ribs registering with each other when the inserts are stacked edgewise against each other in different index positions and being tangent to the end edge faces, said top and bottom surfaces further having other ribs normal to said longitudinal edge faces and extending in the width direction edgewise across said block which provide serrated cutting edges when viewed in section in a plane parallel to said longitudinal side edges and normal to said top and bottom surfaces, the other ribs are out of phase with each other when the inserts are stacked edgewise against each other in different index positions with corner ribs in alignment.

2. The insert of claim 1 in which the two index positions having cutting edges uppermost when the top surface rests on the platform are indicated respectively by o and oo and the other two index positions having cutting edges uppermost when the bottom surface rests on the platform are indicated respectively by ooo and oooo.

3. The insert of claim 1 in which the width of the insert between the longitudinal edge faces is greater than the thickness of the insert between the top and bottom surfaces.

4. The insert of claim 1 in which the insert is adapted to be crowded edgewise by wedge means engaging the leading longitudinal edge face above the platform and below the main cutting edge.

5. The insert of claim 1 in which said insert is formed of tungsten carbide.

6. A cutter comprising a body having a plurality of insert seats around its circumference and an insert constructed and mounted according to claim 1 on each seat so the active edge thereof projects radially beyond said body circumference to provide radially projecting teeth, at least two of which have projecting edges thereof out of phase.

7. The cutter of claim 6 in which the inserts have two index positions having cutting edges uppermost when the top surface rests on the platform are indicated respectively by o and oo and the other two index positions having cutting edges uppermost when the bottom surface rests on the platform are indicated respectively by ooo and oooo.

8. The cutter of claim 6 in which the width of the insert between the longitudinal edge faces is greater than the thickness of the insert between the top and bottom surfaces.

9. The cutter of claim 6 in which said insert is adapted to be crowded edgewise by wedge means engaging the leading longitudinal edge face above the platform and below the surface remote from the platform.

10. The cutter of claim 6 in which said inserts are formed of tungsten carbide.

* * * * *